United States Patent Office 2,806,797
Patented Sept. 17, 1957

2,806,797
METHOD OF STERILIZING

Arno Brasch, Wolfgang Huber, and Adnan Waly, Brooklyn, N. Y., assignors to Electronized Chemicals Corporation, Brooklyn, N. Y., a corporation of Delaware No Drawing. Application January 5, 1953,
Serial No. 329,749

2 Claims. (Cl. 99—221)

The present invention relates primarily to the art of food preservation. Of course the method forming the subject matter of this invention can be used for the preservation of other substances which will suggest themselves; substances which for instance deteriorate in much the same manner as foods, but differ therefrom principally in that they are not customarily eaten.

Methods of food preservation consist in the performance of some steps which have the effect of rendering nonviable all of the microorganisms and insects which cause food spoilage. The food product is thereby rendered sterile and it must thereafter be handled in such fashion as to prevent recontamination.

In Patent No. Re. 23,195, reissued February 7, 1950, there is described a method of rendering food substances sterile by subjecting them to electron bombardment at sufficient intensity to bring about the destruction of all microorganisms. The present process may be considered as a special extension or adaptation of the general process there described to food substances of a particular sort and for a particular purpose.

It is one of the objects of our invention to provide a novel process for the preservation of food products or similar substances of a type which have a comparatively sharply defined outer skin, peel, rind, shell, or the like, as opposed to other food substances not having any such definitely defined boundary, as fluids or ground meats for example.

Another object of the present invention is to provide a novel process for the preservation of such substances as whole fruits, eggs, vegetables and the like by electron bombardment without producing any change which is detectable in the substance.

Yet another object is to provide a novel process for the improvement of certain food products.

Still another object is to provide a novel food treatment process which simplifies the handling of certain food substances.

Other objects and advantages will become apparent from the following description of a preferred embodiment of our invention.

Such food substances as most fresh fruits, most fish, most vegetables, eggs, nuts, seeds, animal carcasses and the like, have a characteristic in common which is important in practicing the present invention. This characteristic is that they have a shell or skin or rind which bounds the food substance and acts to some extent at least as a protective barrier. It is also true, as a rule, that the skin or rind or shell portion of these substances is not usually eaten. A further attribute of these substances is that the interior is normally sterile and bacterial decay is due to microorganisms entering the substance from the outside.

Another consideration which should be kept in mind in so far as the sterilization of foods by electron bombardment is concerned is that some foods at least are affected by the bombardment and in some instances this has a deleterious effect upon the taste or appearance of the food. This invention takes advantage of the aforementioned several characteristics to provide a method of preservation for fruits, vegetables, fish and certain other substances having a skin, shell or the like which, in some instances, effectively preserves such substances for long periods and in all instances greatly extends the shelf life so that the substance may be kept for much longer periods than has heretofore been possible. As will be pointed out presently, this has advantages in addition to those which are apparent.

The fundamental principle of the invention is not to bombard such naturally enclosed substances with high energy electrons or other ionizing penetrating radiation at an intensity and voltage sufficient to produce sterility throughout the substance as has been previously taught, but rather simply to use comparatively low voltage electrons of the order of five hundred thousand to one million volts, for instance. The radiation should, however, be conducted at a high dose rate so as to produce sterility quickly within the range of penetration which should be only into the skin portion of the substance or perhaps slightly therebeneath. This has the effect of destroying all microorganisms which are present on or in the shell, rind, or skin of the substance at the time it is gathered and prepared for treatment.

In carrying out the above process as applied for a specific purpose which will serve as an example, oranges, for instance, are first of all sealed within plastic moisture-proof sacks, or, if desired, they may be coated with any of several films which are impervious to moisture and microorganisms. For convenience such films may be applied as lacquers or the like. The oranges as thus coated or sealed within plastic sacks are bombarded with high intensity electrons at a voltage of the order of five hundred thousand to one million by means of any available source of ionizing penetrating radiation such as an electron accelerator for instance. The dose should be great enough to destroy the capability of propagation of all of the decay producing microorganisms within the penetrating range of the electrons. By a proper selection of the voltage, depending upon the depth to which the organisms have penetrated, it is comparatively simple to destroy all of the microorganisms on the surface of the skin and those which may have worked inwardly a short distance. By this treatment, the rind or skin of the orange is made sterile and it will remain sterile inasmuch as the interior of the plastic sack and the air therein has been sterilized at the same time. Further, the oranges will not dry out and cannot get moldy, since molds will be eliminated by the treatment.

If the oranges as thus treated are laid aside, their shelf life we have found will be greatly extended over that considered normal, and in fact the ultimate destruction of the fruit from the standpoint of its use as human food, will be brought about, not by the activity of microorganisms, but simply by changes due to enzymatic action. In this connection we have observed that in many instances enzymatic activity of a destructive sort is considerably inhibited by the absence of viable microorganisms and the extension of storage life is greater, therefore, than would be expected.

A further advantage is that it is not necessary to take any special measures to avoid changes in taste of the oranges when they are thus treated. After the orange has been peeled, or the juice or pulp extracted therefrom, the juice and pulp portion will be found to be unaffected by the electron bombardment, since the high energy electrons do not reach the edible portion of the fruit, but only affect the skin which is ordinarily discarded.

In some instances unusual advantages have been gained by the use of this process which so far as we know could not be predicted. As an example, eggs normally deteriorate principally because of the evaporation of water therefrom, thereby producing the well known air space at one end. In fact the size of this air space is one of the principal considerations used in arriving at the grade to which particular eggs are entitled. We have found that eggs irradiated with low energy electrons of the order of three hundred thousand volts not only keep much longer from the standpoint of rotting of the edible substance, but in addition, we have found that the air space at the end of the egg develops much more slowly. Put another way, eggs after having been given a surface treatment with high intensity electrons, do not suffer anything like the rate of evaporation of water from the edible substance as is ordinarily encountered.

Our explanation of this unexpected phenomenon is as follows. As is well known, the egg shell is lined with a thin, tough, substantially water impervious membrane known as the membrana putaminis. It has always been understood that this skin slows down the rate of water evaporation but is only a partially effective barrier. We believe that this membrane in its original condition is far more capable of preventing water evaporation from the egg than has heretofore been believed to be the case. It is our belief, from the presence of the before-mentioned phenomenon, that what takes place is that bacteria or other microorganisms on the egg shell work toward the interior and attack this membrane, thereby causing its perforation or in some fashion partially destroying its effectiveness as a water barrier. Thereafter, water is enabled to migrate through the membrane at a more rapid rate so as to produce the commonly found air space within the egg.

By bombarding the egg with electrons of only sufficient penetrating range to destroy microorganisms on or slightly within the shell, there is no bacteria or other microorganism present which can attack the membrane and thereby impair its original effectiveness. Under these conditions water passes through the membrane at a rate which is much slower than that usually observed. We present this explanation as being reasonable in view of the observed facts, particularly since the phenomenon is observed even though no plastic sack or other protection is given the eggs. It will take further investigation to determine whether or not there may be some other explanation for the fact that eggs do not dry out at anything like the usual rate after the egg shell has been bombarded by electrons, even though these electrons do not penetrate substantially beyond the shell, and even though no protective substance is used to inhibit evaporation.

A variation of the above described process, which is highly useful in extending the shelf life of fruits, vegetables, eggs and the like, is to conduct the bombardment in the manner spoken of above but to omit the plastic sack, film or other enclosure. In other words, the substance is thus rendered sterile upon its surface by the electron treatment and as pointed out previously, is normally sterile within. Under these conditions, recontamination of the food substance will of course take place and eventually the substance will be destroyed by microorganisms along with the presence of the customary symptoms. The shelf life, however, is extended far more than might at first appear to be reasonable, and this is because usually the principal rot producing bacteria are soil bacteria. Once their contaminating presence has been removed, the food substance ordinarily will not become recontaminated with soil bacteria, and airborne bacteria produce deleterious effects far more slowly.

Incidentally, we should point out that the surface and slight subsurface sterilizing effect described above cannot be produced by ultraviolet light because ultraviolet will not penetrate to the bottom of pits, folds, crevices and the like which are normally present upon the surface of most food substances. Also, by the time the food substance is gathered and prepared for processing it will almost always be found that some of the microorganisms have already migrated to a position beyond the reach of ultraviolet light, even on smooth skinned substances.

The above described process, with or without some minor modifications, can be adapted to obtain unusual and somewhat surprising effects which are particularly valuable in the case of certain food substances. For instance, animal carcasses even with the hide and viscera removed, are covered by a thin, tough membrane which will act as a protective barrier and so permits the carcass to arrive at the irradiation stage of processing in a condition which is substantially sterile at all regions beyond this membrane. If such carcasses are bombarded with electrons or otherwise subjected to ionizing penetrating radiation so as to sterilize only this membrane, and perhaps the muscle and fat tissue very slightly therebeneath, the carcass can be handled in this condition without other covering for extended periods without refrigeration. We have found, however, that paper or burlap type coverings are usually advisable simply to prevent physical damage in handling. For instance, lamb carcasses so treated by us and simply enclosed in burlap sacks or paper wrapping have been shipped from one point to another in ordinary railroad and other carriers, without refrigeration, for periods up to three weeks without spoilage.

We have also discovered that the normally conducted aging process for certain meats does not depend upon bacteria for accomplishing the useful result as has, so far as we have been able to learn, always been assumed. We have found that this aging improvement is purely an enzymatic process which attacks the collagen distributed throughout the muscle fibers. It is a specific enzymatic effect which stops when the collagen has been partly broken down and results, of course, in the well known effect of converting the initially tough fresh meat into the soft aged product. With this knowledge, and by using our process, we have irradiated the skin portion of animal carcasses in the manner previously described and then aged these carcasses at atmospheric temperatures rather than under refrigeration as is ordinarily required. The result was that aging was complete within twenty-four hours rather than the usual several weeks, and of course no spoilage was encountered.

As another example, whole eviscerated herring, after irradiating just the surfaces thereof, have been kept at ordinary room temperatures for periods of from one to two weeks and thereafter when processed for herring oil the rancidity of the oil was very low as compared with oil removed from similarly stored herring without the use of our process. This of course is of great practical importance, since herring oil is of little value for use in the manufacture of margarine and cosmetic products if it is rancid.

As a further extension of the present process it should be pointed out that certain fruits and vegetables can be harvested before they are ripe and processed as described with respect to oranges, under which conditions the ripening process will continue due to the uninhibited enzymatic action although decay caused by bacteriological action which ordinarily prevents this will be prevented. Also of course, since the shelf life of the fruit will be greatly extended over that normally possible, the fruit can, if desired, be permitted to ripen upon the plant considerably longer than is ordinarily feasible, since decay during shipment and handling will be prevented by the above outlined process. The process, therefore, for both these reasons makes it possible for fruits and vegetables to arrive at the consumer in better condition than is currently possible.

For those unfamiliar with the destruction of bacteria and insects for food preservation or for other purposes by electron bombardment, it should perhaps be pointed out that the previously discussed effects can be achieved by using electron doses of the order of 50,000 rep for insects, larvae and insect eggs, and electron doses of the order of 300,000 rep for bacteria, and of the order of 700,000 rep for spores of bacteria and other microorganisms. These doses are to be interpreted as being sufficient to reduce an average contamination to zero in any one given object. Sterility with heavier than average contamination and more than one sample will be achieved by appropriate dose increments to be calculated by standard techniques. The above-mentioned doses should preferably be administered at a rate of the order of 20,000 rep/second. As pointed out previously, energy levels of 300,000 to 1,000,000 electron volts are ordinarily sufficient.

The essential feature of our process, therefore, is the bombarding of food substances of the type which have a skin, shell, peel, rind, or other barrier on the periphery thereof with high energy electrons at voltages only sufficient to reach microorganisms on or just within the skin portion of the substance but not substantially therebeyond. This results in effective preservation at low expense and without effect upon the interior substance.

Having described our invention, what we claim as new and useful and desire to secure by Letters Patent of the United States is:

1. The method of preserving food substances of the type which has a naturally present covering which acts as a partial protection over the portion ordinarily eaten, which comprises, bombarding the food substance with the naturally present covering thereon with penetrating ionizing radiation to a sufficient dose to inactivate decay causing microorganisms and at a sufficient velocity to bring about substantial penetration of the naturally present covering without substantial penetration of the portion ordinarily eaten so as to reach microorganisms on or just within the skin portion of the substance but not substantially therebeyond, said dose being within the range of between fifty thousand rep and seven hundred thousand rep, said velocity being equivalent to an electron voltage within the range of between three hundred thousand volts and one million volts, and said dose being administered at a rate of not less than approximately twenty thousand rep per second.

2. The method of preserving food substances of the type which have a naturally present covering which acts as a partial protection over the portion ordinarily eaten, which comprises, enclosing such substances with the naturally present covering thereon in a film impervious to the passage of microorganisms, bombarding the food substance as thus enclosed and with the naturally present covering thereon with penetrating ionizing radiation to a sufficient dose to inactivate decay causing microorganisms and at a sufficient velocity to bring about substantial penetration of the naturally present covering without substantial penetration of the portion ordinarily eaten so as to reach microorganisms on or just within the skin portion of the substance but not substantially therebeyond, said dose being within the range of between fifty thousand rep and seven hundred thousand rep, said velocity being equivalent to an electron voltage within the range of between three hundred thousand volts and one million volts, and said dose being administered at a rate of not less than approximately twenty thousand rep per second.

References Cited in the file of this patent
UNITED STATES PATENTS

| | | |
|---|---|---|
| Re. 23,195 | Brasch | Feb. 7, 1950 |
| 2,456,909 | Brasch | Dec. 21, 1948 |